(12) United States Patent
Budka

(10) Patent No.: US 10,075,200 B2
(45) Date of Patent: Sep. 11, 2018

(54) LOW DISTORTION ANTENNA SWITCHING CIRCUITRY

(71) Applicant: RF Micro Devices, Inc., Greensboro, NC (US)

(72) Inventor: Thomas Philip Budka, Niskayuna, NY (US)

(73) Assignee: Qorvo US, Inc., Greensboro, NC (US)

( * ) Notice: Subject to any disclaimer, the term of this patent is extended or adjusted under 35 U.S.C. 154(b) by 68 days.

(21) Appl. No.: 14/560,399

(22) Filed: Dec. 4, 2014

(65) Prior Publication Data

US 2015/0155906 A1    Jun. 4, 2015

Related U.S. Application Data

(60) Provisional application No. 61/911,762, filed on Dec. 4, 2013.

(51) Int. Cl.
*H04B 1/00* (2006.01)

(52) U.S. Cl.
CPC .................. *H04B 1/006* (2013.01)

(58) Field of Classification Search
CPC .......... H04B 1/44; H04B 1/525; H04B 1/401; H04B 1/40; H04B 1/48; H04B 1/006; H04B 1/18; H04B 1/04; H04B 1/16; H01L 2924/00; H01L 2224/32225; H01L 2224/48227; H01L 2224/73265; H01L 2224/97; H01L 2224/48091; H01L 2224/92247; H01L 2924/0002; H01L 2924/181; H03K 17/693

See application file for complete search history.

(56) References Cited

U.S. PATENT DOCUMENTS

| | | | | |
|---|---|---|---|---|
| 2003/0003881 A1* | 1/2003 | Anim-Appiah | ...... | H04B 7/0602 455/101 |
| 2005/0032484 A1* | 2/2005 | Itakura | ...... | H01P 1/15 455/114.1 |
| 2011/0021245 A1* | 1/2011 | Taniuchi | ...... | H04B 1/50 455/552.1 |
| 2016/0127115 A1* | 5/2016 | Hayafuji | ...... | H04B 1/10 370/278 |

* cited by examiner

*Primary Examiner* — Andrew Wendell
*Assistant Examiner* — Maryam Soltanzadeh
(74) *Attorney, Agent, or Firm* — Withrow & Terranova, P.L.L.C.

(57) ABSTRACT

Antenna switching circuitry includes an antenna node, a number of signal path nodes, and a number of switching elements. Each one of the switching elements is coupled between a different one of the signal path nodes and the antenna node. At least two of the signal path nodes are coupled together in order to form a low distortion node, such that the switching elements between the low distortion node and the antenna node are used to pass a low-distortion radio frequency (RF) signal. By coupling two of the signal path nodes together, a low distortion signal path is created to the antenna. Creating a low distortion signal path using multiple switching elements allows for the size of the switching elements to remain small, which reduces the parasitic capacitance of each one of the switches and therefore the insertion loss of the antenna switching circuitry.

16 Claims, 3 Drawing Sheets

LOW DISTORTION ANTENNA SWITCHING CIRCUITRY

RELATED APPLICATIONS

This application claims the benefit of U.S. provisional patent application Ser. No. 61/911,762, filed Dec. 4, 2013, the disclosure of which is incorporated herein by reference in its entirety.

FIELD OF THE DISCLOSURE

The present disclosure relates to antenna switching circuitry, and specifically to reconfigurable antenna switching circuitry with low insertion loss and low harmonic distortion.

BACKGROUND

Antenna switching circuitry is used to connect one or more radio frequency (RF) antennas to any number of signal paths in RF front-end circuitry in order to transmit and/or receive RF signals from an RF communications device. Due to considerations such as RF signal power, adjacent RF communications bands, and spectral masking requirements, one or more of the signal paths in the RF front end circuitry may require a particularly low distortion path to or from the antenna. For example, band 13 is adjacent to a reserved public safety band, and therefore is subject to strict spectral masking requirements in order to avoid producing interference therein. As a further example, band 17 is also adjacent to a reserved band, and therefore must also meet strict spectral masking requirements. Generally, these spectral masking requirements can be met by reducing harmonic distortion in the antenna switching circuitry. Accordingly, many designers have turned to antenna switching circuitry utilizing large (e.g., ≥3.5 mm) switching elements. Large switching elements generally have lower on-state impedances than their smaller counterparts, which may reduce harmonics generated from a signal passing through a particular switching element. While generally effective for reducing interference, the relatively low on-state impedance associated with large switching elements comes at the expense of increased parasitic capacitance. With an increase in the parasitic capacitance of the large switching elements comes a commensurate increase in insertion loss, and further may mandate the use of additional matching circuitry along with the antenna switching circuitry which further increases insertion loss and design size.

While the increased parasitic capacitance may be a necessary trade-off for one or more signal paths, over-designing antenna switching circuitry using large switching elements for every signal path in the RF front-end circuitry generally degrades the performance of the antenna switching circuitry. Accordingly, some designers have used custom antenna switching circuitry which utilizes a combination of large switching elements and smaller switching elements as the requirements of the RF signal paths coupled to the antenna switching circuitry mandate. While generally effective at decreasing interference while striking an adequate balance with insertion loss, such solutions must be custom designed for the RF front-end circuitry with which they are used, resulting in significant increases in design and manufacturing expenses.

In light of the above, there is a need for antenna switching circuitry with low distortion characteristics and low insertion loss that is adaptable to different RF front-end circuitry and RF signal path assignments to the antenna switching circuitry.

SUMMARY

The present disclosure relates to antenna switching circuitry, and specifically to reconfigurable antenna switching circuitry with low insertion loss and low harmonic distortion. In one embodiment, antenna switching circuitry includes an antenna node, a number of signal path nodes, and a number of switching elements. Each one of the switching elements is coupled between a different one of the signal path nodes and the antenna node. At least two of the signal path nodes are coupled together in order to form a low distortion node, such that the switching elements between the low distortion node and the antenna node are used to pass a low-distortion radio frequency (RF) signal. By coupling two of the signal path nodes together, a low distortion signal path is created to the antenna. Creating a low distortion signal path using multiple switching elements allows for the size of the switching elements to remain smaller than would otherwise be possible to avoid interference in the low distortion signal path, which reduces the parasitic capacitance of each one of the switches and therefore the insertion loss of the antenna switching circuitry as a whole.

In one embodiment, each one of the switching elements is smaller than about 2.0 mm. Accordingly, the parasitic capacitance and thus the insertion loss of the antenna switching circuitry are significantly reduced.

In one embodiment, the antenna switching circuitry further includes switching control circuitry coupled to each one of the switching elements and configured to receive a signal routing control signal indicating a desired signal path from the antenna to one or more of the signal path nodes and provide a switching control signal to each one of the switching elements in order to connect the desired signal path nodes to the antenna. The antenna switching control circuitry may provide the switching control signals such that the switching elements between the low distortion node and the antenna node are operated synchronously.

In one embodiment, a mobile communications device includes an antenna, RF front-end circuitry, and antenna switching circuitry coupled between the antenna and the RF front-end circuitry. The antenna switching circuitry includes an antenna node coupled to the antenna, a number of signal path nodes coupled to the RF front end circuitry, and a number of switching elements. Each one of the switching elements is coupled between a different one of the signal path nodes and the antenna node. At least two of the signal path nodes are coupled together in order to form a low distortion node, such that the switching elements between the low distortion node and the antenna node are used to pass a low-distortion RF signal. By coupling two of the signal path nodes together, a low distortion signal path is created to the antenna. Creating a low distortion signal path using multiple switching elements allows the size of the switching elements to remain smaller than would otherwise be possible to avoid interference in the low distortion signal path, which reduces the parasitic capacitance of each one of the switches and therefore the insertion loss of the antenna switching circuitry as a whole.

In one embodiment, the antenna switching circuitry further includes switching control circuitry coupled to each one of the switching elements and configured to receive a signal routing control signal indicating a desired signal path from the antenna to one or more of the signal path nodes and provide a switching control signal to each one of the switching elements in order to connect the desired signal path nodes to the antenna. The antenna switching control circuitry may provide the switching control signals such that the switching elements between the low distortion node and the antenna node are operated synchronously.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
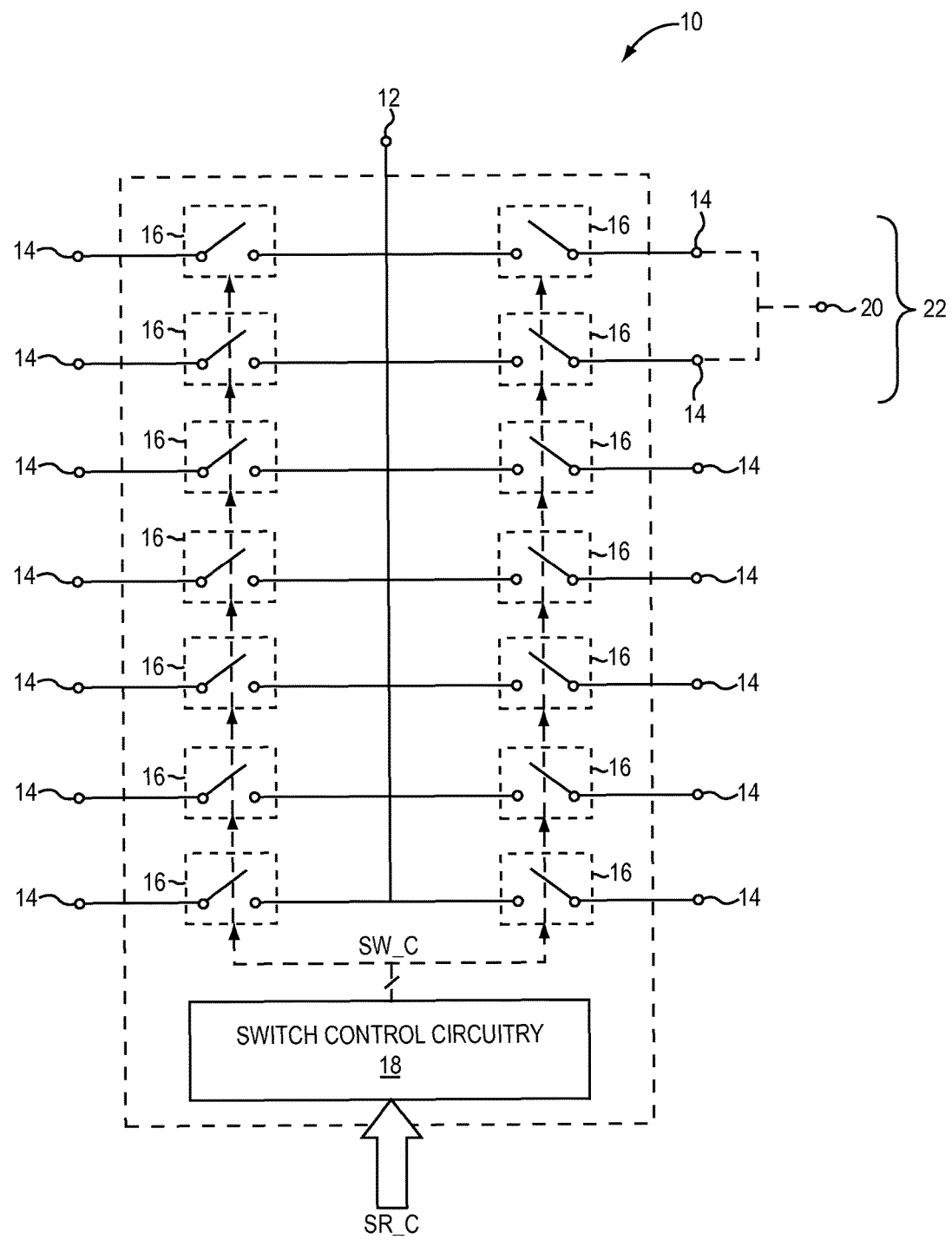
FIG. 1 illustrates antenna switching circuitry according to one embodiment of the present disclosure.

FIG. 1 shows antenna switching circuitry 10 according to one embodiment of the present disclosure. The antenna switching circuitry 10 includes an antenna node 12, a number of signal path nodes 14, and a number of switching elements 16. Specifically, the antenna switching circuitry 10 shown in FIG. 1 is a single pole fourteen throw switch (SP14T) and therefore includes fourteen signal path nodes 14 and fourteen switching elements 16, however, any number of signal path nodes 14 and switching elements 16 may be used without departing from the principles of the present disclosure. Generally, because two or more of the signal path nodes 14 and the switching elements 16 may be combined into a single low distortion signal path, as discussed in detail below, the antenna switching circuitry 10 should include a number of signal path nodes 14 and switching elements 16 that is greater than the number of signal paths present in radio frequency (RF) front end circuitry (not shown) to which the antenna switching circuitry 10 is coupled. Each one of the switching elements 16 is coupled between a different one of the signal path nodes 14 and the antenna node 12. Switch control circuitry 18 is coupled to each one of the switching elements 16 and configured to independently control the state of each one of the switching elements 16 with a separate switching control signal SW_C. Specifically, the switch control circuitry 18 receives a signal routing control signal SR_C, for example, from RF front-end circuitry (not shown), which the switch control circuitry 18 uses to determine the desired state of the switching elements 16 and provides a switching control signal SW_C to each one of the switching elements 16 accordingly.

Notably, at least two of the signal path nodes 14 that are adjacent to one another are coupled together to form a low-distortion signal path node 20 and a low-distortion signal path 22. While only two of the signal path nodes 14 are shown coupled together to form the low-distortion signal path node 20 in FIG. 1, any number of signal path nodes 14 may be coupled together without departing from the principles of the present disclosure. Further, although only one low-distortion signal path node 20 is shown in FIG. 1, any number of low-distortion signal path nodes 20 may be formed by combining together additional sets of signal path nodes 14. Generally, the larger the number of signal path nodes 14 coupled together into the low-distortion signal path node 20, the lower the distortion generated in the path from the low-distortion signal path node 20 to the antenna node 12. Accordingly, the particular number of signal path nodes 14 coupled together to form the low-distortion signal path node 20 may vary based on the distortion requirements of a signal passed via the low-distortion signal path node 20. The antenna switching circuitry 10 may be manufactured and provided such that the signal path nodes 14 are initially independent of one another. The signal path nodes 14 may be later coupled together externally, off of the integrated circuitry (IC) of the antenna switching circuitry 10, for example, as the design requirements of RF front-end circuitry to which the antenna switching circuitry 10 is attached dictate. Accordingly, the design of the antenna switching circuitry 10 may be flexible, such that one or more low-distortion signal path nodes 20 may be created as they are needed and at the locations that they are needed.

To complement the low-distortion signal path nodes 20, the switch control circuitry 18 is programmable, such that one or more of the switching elements 16 may be operated synchronously. Switching elements 16 that are between the same low-distortion signal path node 20 and the antenna node 12 such that they are in the same low-distortion signal path 22 should be operated synchronously so that the switching elements 16 are essentially combined into a single larger switching element. Using multiple switching elements 16 in the signal path between the low-distortion signal path node 20 and the antenna node 12 and operating them synchronously allows a designer to form the low-distortion signal path 22 for signals that are especially sensitive to distortion. For example, the low-distortion signal path 22 may be used to communicate band 13 and/or band 17 signals, which, for the reasons discussed above, may be subject to particularly stringent distortion requirements.

In general, the antenna switching circuitry 10 is designed such that adjacent switching elements 16 may be turned ON at the same time to create a switching element that is effectively twice as large and thus has significantly reduced distortion. In the exemplary embodiment above in which the antenna switching circuitry 10 is a SP14T switch including two low distortion signal paths 22, the antenna switching circuitry 10 effectively becomes a single pole twelve throw (SP12T) switch. The parasitic capacitance of the antenna switching circuitry 10 may be up to 50% lower than equivalent SP12T antenna switching circuitry including large switching elements to compensate for distortion in one or more highly sensitive paths.

Using multiple switching elements 16 coupled together at a low-distortion signal path node 20 allows the size of the switching elements 16 to remain significantly smaller than if a single switching element was to be used, as in conventional solutions. In other words, because multiple switching elements 16 may be combined in a low-distortion signal path 22, the physical size of these switching elements 16 may be smaller than would otherwise be possible due to distribution of a signal in the low-distortion signal path 22 across the switching elements 16. In one embodiment, the switching elements 16 may be smaller than about 2.0 mm. Using small switching elements 16 allows the switching elements 16 that are not used in a low-distortion signal path 22 to retain desirable parasitic capacitances, as they are not designed for the most sensitive or worst-case signal path, as in conventional solutions. Further, using multiple switching elements 16 coupled together to form the low-distortion signal path 22 allows all of the switching elements 16 in the antenna switching circuitry 10 to remain the same size, allowing the designer to combine as many of the switching elements 16 as necessary to form low-distortion signal paths 22 where needed and thus making the antenna switching circuitry 10 adaptable to any RF front end circuitry. Accordingly, costs may be saved on design and fabrication over custom antenna switching solutions.

The signal routing control signal SR_C may be communicated to the switch control circuitry 18 in any number of ways. In one embodiment, the signal routing control signal SR_C is delivered to the switch control circuitry 18 via a number of general purpose input/output (GPIO) signals. In such an embodiment, the number of GPIO signals necessary to control the switching elements 16 is equal to the number of switching elements 16. For example, if there are sixteen switching elements 16, sixteen GPIO signals are necessary to control all of the switching elements 16 independently. In another embodiment, the signal routing control signal SR_C is delivered to the switch control circuitry 18 via a mobile industry processor interface (MIPI) signal delivered via a serial interface. In additional embodiments, the signal routing control signal SR_C may be communicated to the switch control circuitry 18 in any suitable manner.

Figure 2:
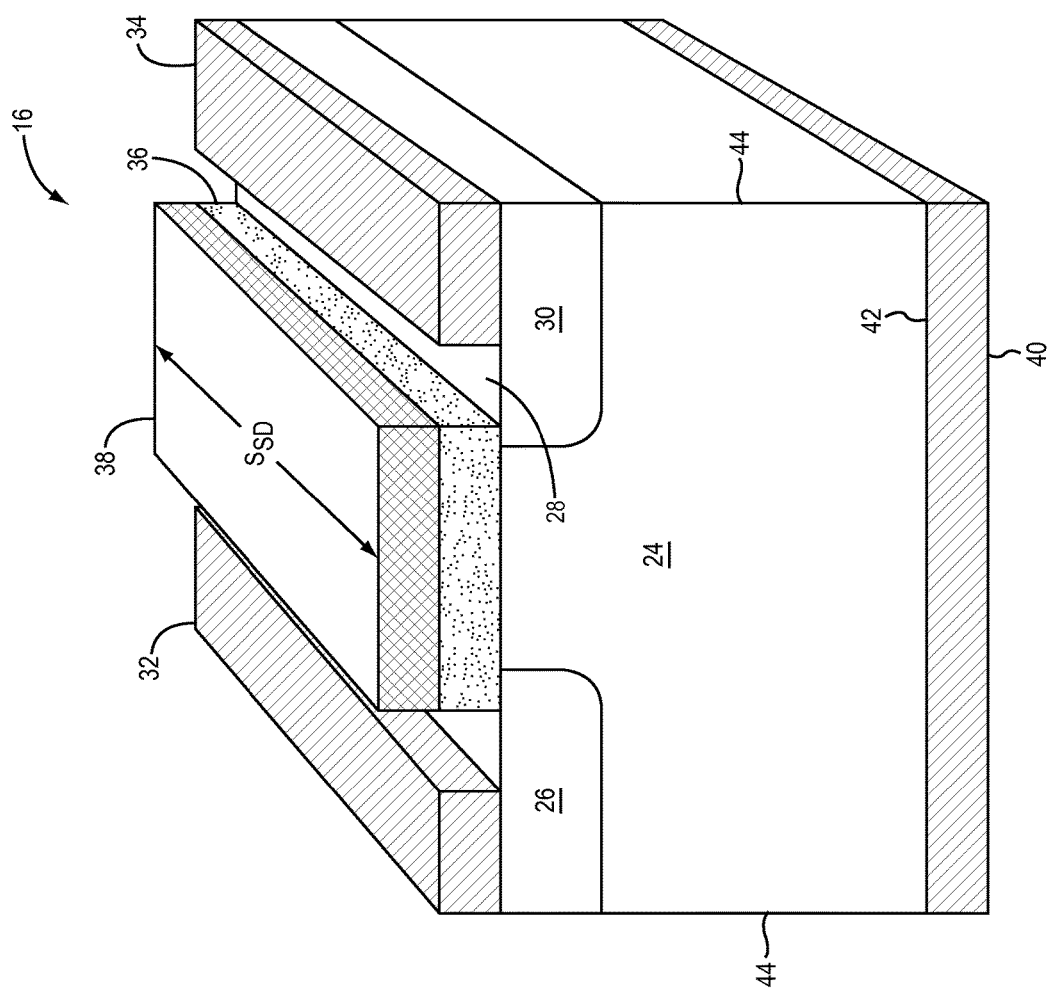
FIG. 2 illustrates an exemplary switching element that may be present in the antenna switching circuitry of FIG. 1 according to one embodiment of the present disclosure.

FIG. 2 shows details of one of the switching elements 16 shown in FIG. 1 according to one embodiment of the present disclosure. The switching element 16 shown in FIG. 2 is a metal-oxide-semiconductor field-effect transistor (MOSFET), however, any suitable switching device may be used for the switching elements 16 without departing from the principles of the present disclosure. The switching element 16 includes a substrate 24, a drain region 26 in a first surface 28 of the substrate 24, a source region 30 laterally separated from the drain region 26 in the first surface 28 of the substrate 24, a drain contact 32 over a portion of the drain region 26, a source contact 34 over the source region 30, a gate oxide layer 36 over the first surface 28 of the substrate 24 such that the gate oxide layer 36 partially overlaps and runs between the drain region 26 and the source region 30 without contacting the drain contact 32 or the source contact 34, and a gate contact 38 over the gate oxide layer 36. An additional substrate or body contact 40 may be located on a second surface 42 of the substrate 24 opposite the first surface 28.

The gate finger length of the switching device 16 determines the size $S_{SD}$ of the switching device 16. As discussed above, the antenna switching circuitry 10 allows the size of the switching devices 16 therein to be kept small. In one embodiment, the size $S_{SD}$ of the switching device 16 may be less than 2.0 mm. Keeping the size of the switching devices 16 small allows the switching devices 16 used independently of one another to retain a low parasitic capacitance when compared to the larger switches used in conventional solutions. Further, because more than one switching device 16 can be combined with one another via the low-distortion signal path node 20, the antenna switching circuitry 10 can be customized as needed to pass signals that are particularly sensitive to distortion, as discussed above.

In operation, a switching control signal SW_C is applied to the gate contact 38 of the switching device 16. When the switching control signal SW_C is above a threshold voltage of the switching device 16, an inversion channel layer is created in the device, thereby allowing current to flow between the drain contact 32 and the source contact 34 and placing the switching element 16 into an ON state of operation. The size $S_{SD}$ of the switching device 16 determines the amount of current that the device passes from the drain contact 32 to the source contact 34 and thus the ON state resistance of the device, which dictates the amount of distortion generated by the switching device 16. When the switching control signal SW_C is not applied or is below the threshold voltage of the device, the inversion channel layer is not formed, and any voltage across the drain contact 32 and the source contact 34 is supported by the substrate 24, thereby placing the switching element 16 into an OFF state of operation. The substrate 24 provides a capacitive connection between the drain contact 32 and the source contact 34 when the device is in an off state. The size $S_{SD}$ of the switching device 16 determines the capacitance between the drain region 26 and the source region 30. Specifically, the smaller the size $S_{SD}$ of the switching device 16, the lower the parasitic capacitance between the drain contact 32 and the source contact 34. Accordingly, the parasitic capacitances of the switching devices 16 in the antenna switching circuitry 10 are kept small due to the small size thereof.

Figure 3:
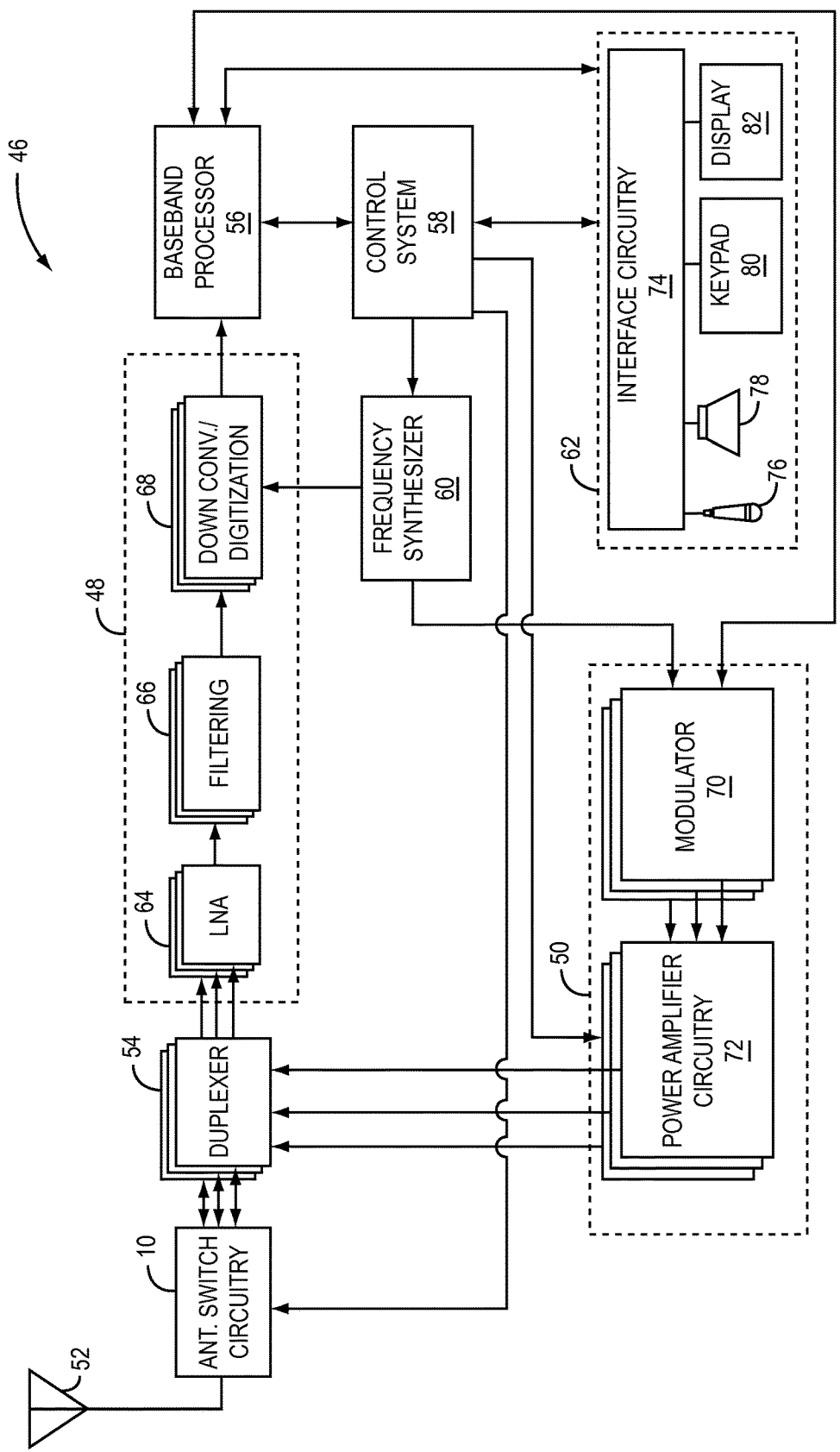
FIG. 3 illustrates RF communications circuitry which may include the antenna switching circuitry of FIG. 1 according to one embodiment of the present disclosure.

One application of the antenna switching circuitry 10 is in RF communications circuitry 46, as shown in FIG. 3. The RF communications circuitry 46 includes a receiver front end 48, an RF transmitter section 50, an antenna 52, duplexer circuitry 54, a baseband processor 56, a control system 58, a frequency synthesizer 60, and an interface 62. In operation, the receiver front end 48 receives information via an RF signal from one or more remote transmitters (not shown) via the antenna switching circuitry 10 and the duplexer circuitry 54. Low noise amplifier (LNA) circuitry 64 amplifies the signal and supplies it to filtering circuitry 66, which minimizes broadband interference in the received signal. Down conversion and digitization circuitry 68 down converts the filtered, received signal to an intermediate or baseband frequency signal, which is then digitized into one or more digital streams. The receiver front end 48 typically uses one or more mixing frequencies generated by the frequency synthesizer 60. The baseband processor 56 processes the digitized received signal to extract the information or data bits conveyed in the signal. This processing typically comprises demodulation, decoding, and error correction operations. As such, the baseband processor 56 may be implemented in one or more digital signal processors (DSPs).

On the transmit side, the baseband processor 56 receives digitized data, which may represent voice, data, or control information, from the control system 58, which it encodes for transmission. The encoded data is output to the RF transmitter section 50, where it is used by a modulator 70 to modulate a carrier signal at a desired transmit frequency. An RF power amplifier (PA) 72 amplifies the modulated carrier signal to a level appropriate for transmission, and delivers the amplified and modulated carrier signal to the antenna 52 via the duplexer circuitry 54 and the antenna switching circuitry 10.

A user may interact with the RF communications circuitry 46 via the interface 62, which may include interface circuitry 74 associated with a microphone 76, a speaker 78, a keypad 80, and a display 82. The interface circuitry 74 generally includes analog-to-digital converters, digital-to-analog converters, amplifiers, and the like. Additionally, the interface circuitry 74 may include a voice encoder/decoder, in which case the circuitry may communicate directly with the baseband processor 56. Audio information encoded in the received signal is recovered by the baseband processor 56 and converted by the interface circuitry 74 into an analog signal suitable for driving the speaker 78. The keypad 80 and the display 82 enable a user to interact with the RF communications device 46. For example, the keypad 80 and the display 82 may enable the user to input numbers to be dialed, access address book information, or the like, as well as monitor call progress information.

As shown in FIG. 3, there may be a number of duplicate components in the duplexer circuitry 54, the receiver front end 48 and the RF transmitter section 50. In one embodiment, there is a different subset of components in each one of the receiver front end 48 and the RF transmitter section 50 for each band or a combination of bands to be transmitted and received from the RF communications device 46. For example, separate LNA circuitry 64, filtering circuitry 66, and down conversion and digitization circuitry 68 may exist for each band or some combination of bands that are to be received by the RF communications device 46. Further, a separate modulator 70 and RF PA 72 may exist for each band or some combination of bands that are to be transmitted by the RF communications device 46. Each of the subsets of components in the receiver front end 48 and the RF transmitter section 50 may be specifically optimized for the band or bands they service, thereby increasing the performance of the RF communications circuitry 46. The control system 58 supplies the signal routing control signal SR_C to the antenna switching circuitry 10 based on the desired signal path or signal paths from the antenna 52 to the particular subset of components in the receiver front end 48 and/or the RF transmitter section 50 via a particular subset of the duplexer circuitry 54. The switch control circuitry 18 then sends the appropriate control signals to the various switching elements 16 in the antenna switching circuitry 10 in order to form the desired signal paths. As discussed above, multiple switching elements 16 in the antenna switching circuitry 10 may be associated with a single signal path and thus switched synchronously by the antenna switching circuitry 10 in order to provide a low-distortion signal path 22 for signals with particularly demanding interference requirements. The particular signal paths in the receiver front end 48 and/or the RF transmitter section 50 to be coupled to a low-distortion signal path 22 may be readily adapted by coupling together multiple signal path nodes 14 in the antenna switching circuitry 10 and programming the switch control circuitry 18 therein to synchronously operate the switches in the low-distortion signal path 22. Accordingly, the antenna switching circuitry 10 is readily adaptable to any configuration of the RF communications circuitry 46.

Those skilled in the art will recognize improvements and modifications to the embodiments of the present disclosure. All such improvements and modifications are considered within the scope of the concepts disclosed herein and the claims that follow.

What is claimed is:
1. Antenna switching circuitry comprising:
 a first radio frequency (RF) signal path comprising a first series switching element coupled between a first signal path node and a common antenna node;
 a second RF signal path comprising a second series switching element coupled between a second signal path node and the common antenna node, wherein the first signal path node and the second signal path node are coupled together via a reduced distortion RF signal path node such that the first RF signal path is coupled in parallel with the second RF signal path between the common antenna node and the reduced distortion RF signal path node;
 a third RF signal path comprising a third series switching element coupled between a third signal path node and the common antenna node;
 switching control circuitry coupled to the first series switching element, the second series switching element, and the third series switching element and configured to synchronously operate the first series switching element to couple the first signal path node to the common antenna node and the second series switching element to couple the second signal path node to the common antenna node such that a reduced distortion RF signal path comprising the first RF signal path and the second RF signal path parallel to the first RF signal path is formed between the reduced distortion RF signal path node and the common antenna node; and
 transceiver circuitry coupled to the reduced distortion RF signal path node and the third signal path node, wherein the transceiver circuitry is configured to provide signals about a first operating band to the reduced distortion RF signal path node, provide signals about a second operating band to the third signal path node, provide signals about a third operating band to a fourth signal path node, and provide signals about a fourth operating band to an additional reduced distortion RF signal path node.

2. The antenna switching circuitry of claim 1 wherein each one of the first series switching element, the second series switching element, and the third series switching element is smaller than about 2.0 mm.

3. The antenna switching circuitry of claim 1 wherein the antenna switching circuitry is an integrated circuit.

4. The antenna switching circuitry of claim 1 wherein the first operating band is one of band 13 and band 17.

5. The antenna switching circuitry of claim 1 further comprising a fourth RF signal path comprising a fourth series switching element coupled between the fourth signal path node and the common antenna node.

6. The antenna switching circuitry of claim 5 further comprising:
a fifth RF signal path comprising a fifth series switching element coupled between a fifth signal path node and the common antenna node; and
a sixth RF signal path comprising a sixth series switching element coupled between a sixth signal path node and the common antenna node, wherein the fifth signal path node and the sixth signal path node are coupled together via an additional reduced distortion RF signal path node and the switching control circuitry is configured to synchronously operate the fifth series switching element and the sixth series switching element such that the additional reduced distortion RF signal path is formed between the additional reduced distortion RF signal path node and the common antenna node.

7. The antenna switching circuitry of claim 6 wherein transceiver circuitry is coupled to the reduced distortion RF signal path node, the third signal path node, the fourth signal path node, and the additional reduced distortion RF signal path node.

8. The antenna switching circuitry of claim 1 wherein the switching control circuitry is configured to receive a signal routing control signal indicating a desired signal path to the common antenna node and provide a switching control signal to the first series switching element, the second series switching element, and the third series switching element in order to create the desired signal path.

9. A mobile communications device comprising:
transceiver circuitry; and
antenna switching circuitry coupled to the transceiver circuitry, the antenna switching circuitry comprising:
a first radio frequency (RF) signal path comprising a first series switching element coupled between a first signal path node and a common antenna node;
a second RF signal path comprising a second series switching element coupled between a second signal path node and the common antenna node, wherein the first signal path node and the second signal path node are coupled together via a reduced distortion RF signal path node such that the first RF signal path is coupled in parallel with the second RF signal path between the common antenna node and the reduced distortion RF signal path node;
a third RF signal path comprising a third series switching element coupled between a third signal path node and the common antenna node; and
switching control circuitry coupled to the first series switching element, the second series switching element, and the third series switching element and configured to synchronously operate the first series switching element to couple the first signal path node to the common antenna node and the second series switching element to couple the second signal path node to the common antenna node such that a reduced distortion RF signal path comprising the first RF signal path and the second RF signal path parallel to the first RF signal path is formed between the reduced distortion RF signal path node and the common antenna node;
wherein the transceiver circuitry is configured to provide signals about a first operating band to the reduced distortion RF signal path node, provide signals about a second operating band to the third signal path node, provide signals about a third operating band to a fourth signal path node, and provide signals about a fourth operating band to an additional reduced distortion RF signal path node.

10. The mobile communications circuitry of claim 9 wherein each one of the first series switching element, the second series switching element, and the third series switching element is smaller than about 2.0 mm.

11. The mobile communications circuitry of claim 9 wherein the antenna switching circuitry is an integrated circuit.

12. The mobile communications circuitry of claim 10 wherein the transceiver circuitry is configured to provide signals about a first operating band to the reduced distortion RF signal path node and provide signals about a second operating band to the third signal path node.

13. The mobile communications circuitry of claim 12 wherein the first operating band is one of band 13 and band 17.

14. The mobile communications circuitry of claim 9 further comprising a fourth RF signal path comprising the fourth series switching element coupled between a fourth signal path node and the common antenna node.

15. The mobile communications circuitry of claim 14 further comprising:
a fifth RF signal path comprising a fifth series switching element coupled between a fifth signal path node and the common antenna node; and
a sixth RF signal path comprising a sixth series switching element coupled between a sixth signal path node and the common antenna node, wherein the fifth signal path node and the sixth signal path node are coupled together via the additional reduced distortion signal path node and the switching control circuitry is configured to synchronously operate the fifth series switching element and the sixth series switching element such that an additional reduced distortion RF signal path is formed between the additional reduced distortion RF signal path node and the common antenna node.

16. The mobile communications circuitry of claim 9 wherein the switching control circuitry is configured to receive a signal routing control signal indicating a desired signal path to the common antenna node and provide a switching control signal to the first series switching element, the second series switching element, and the third series switching element in order to create the desired signal path.

* * * * *